April 24, 1962   W. B. FELL   3,030,710
MICRO-PRECISION LEVELS
Filed June 6, 1956
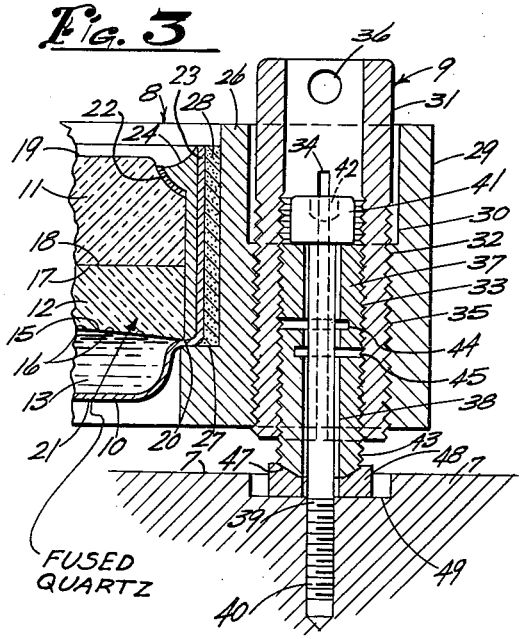
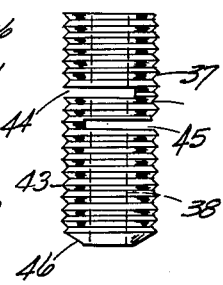
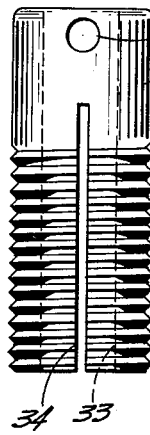
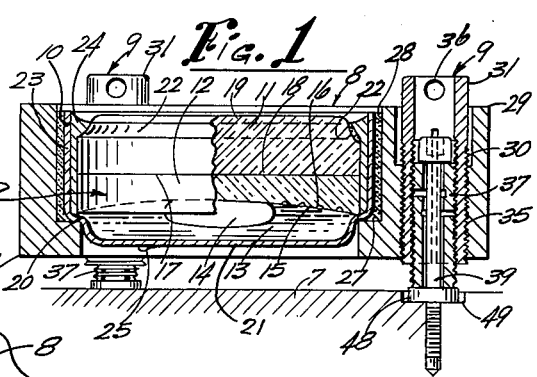
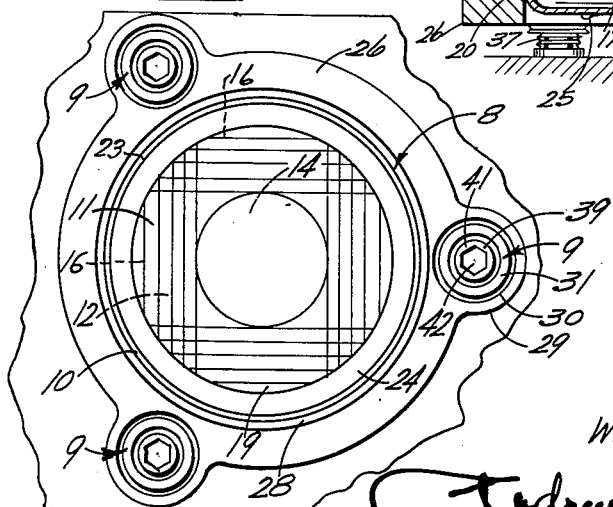
INVENTOR
WILLIAM B. FELL
ATTY.

United States Patent Office 3,030,710
Patented Apr. 24, 1962

3,030,710
MICRO-PRECISION LEVELS
William B. Fell, 320 McLain Ave., Rockford, Ill.
Filed June 6, 1956, Ser. No. 589,731
7 Claims. (Cl. 33—212)

This invention relates to micro-precision levels and is particularly concerned with improvements in the circular type of spirit levels disclosed in my Patents Nos. 2,211,201 and 2,316,777.

The principal object of my invention is to provide a precision level of greater sensitivity and accuracy, as well as much greater stability so far as reaction to temperature changes is concerned, whereby to extend the field of practical usage of these levels, and, by virtue of their stability, gained by the special construction hereinafter described, enable use outdoors as well as indoors and without regard to anticipated variations in temperature.

In the level of my present invention I have eliminated the accuracy limitation involved where ordinary plate glass was used in sighting the bubble, such limitation being due partly to the fact that the concave bottom surface of the glass cover disk or lens is struck on such a large radius to obtain the desired sensitivity, and partly to the fact that with such a shallow concavity, the slightest expansion or contraction of the glass with temperature change is enough to make a big difference in the ultimate accuracy of the level. In accordance with my invention, therefore, I propose using fused quartz for the cover disk or lens, because fused quartz has a much lower temperature coefficient of expansion than either plate glass or Pyrex, its coefficient being approximately one-eighteenth that of plate glass and one-sixth that of Pyrex, thus making it practical to increase the radius of curvature of the concave bottom on the quartz cover disk for proportionately increased sensitivity and accuracy. Due to the extremely high melting point of fused quartz it presents a bigger problem than plate glass in sealing the disk in a metal cup, and hence, in order to simplify commercial production problems by utilizing the seal disclosed in my Patent No. 2,316,777, wherein a metal ring is fused to the cover glass and is soldered to the cup, I use a top cover glass and provide a bottom disk of fused quartz with the graduation lines inscribed thereon under the cover glass, the fused quartz disk having a flat, smooth top surface in abutment with a flat, smooth bottom surface on the cover glass. In that way I can retain all of the advantages of the old construction of my Patent No. 2,316,777 without the accuracy limitations mentioned, and obtain further advantages, which will be pointed out in detail hereinafter. The graduation lines are usually provided on the quartz disk, preferably on the concave bottom thereof, for closest accuracy and greater facility of reading.

The invention is illustrated in the accompanying drawing, in which—

FIG. 1 is a vertical section through a micro-precision level made in accordance with my invention, utilizing a fused quartz bottom disk in combination with a plate glass cover disk and including also my improved precision level adjustment means;

FIG. 2 is a plan view of FIG. 1;

FIG. 3 is an enlargement of a portion of FIG. 1, and

FIGS. 4 and 5 are side views of the outer sleeve and hollow inner screw, respectively, seen in section in FIG. 3.

The same reference numerals are applied to corresponding parts throughout the views.

Referring to the drawing, and particularly FIGS. 1 and 2, the reference numeral 7 designates the portable frame or base for the level, which, like that of my Patent No. 2,316,777, is of hollow cast iron construction and generally rectangular in form, having handles at opposite ends for convenience in lifting the instrument out of its carrying case and placing it on the work, and moving it from place to place. The bottom of the portable base (not shown) in that type of level is flat, so as to be adapted to rest on the flat top of the bed of a machine to be levelled, and the level unit, indicated generally by the reference numeral 8, is mounted on top of the portable base on three evenly circumferentially spaced adjustable supports indicated generally by the reference numeral 9. The level will be accurately adjusted by the level manufacturer at the time the instrument is assembled, and should not thereafter require much, if any, adjustment of the supports 9. It will be understood, however, that a level unit 8 may also be adjustably supported, as shown at 9, in a fixed support on a machine or instrument equipped with a level of the kind herein disclosed, there being various machines and instruments, such as astronomical, surveying, physical, etc., requiring accurate levelling, for which a level a sensitive and accurate as the one herein disclosed is suitable.

The level unit 8 consists of a circular sheet metal cup 10, circular glass cover disk or lens 11, circular fused quartz bottom disk or lens 12 therebeneath, and an ether pool 13 with an air bubble 14 therein cooperating with the spherically concave bottom surface 15 of the quartz disk, which gives the circular form to the bubble floating on top of the pool. The spherical concavity of the bottom surface 15 is very slight, being generated on a long radius from a center on the vertical axis of the spherical surface through the center of the disks 11 and 12. The graduation lines 16, which extend at right angles to one another and are disposed substantially parallel to the edges of the rectangular base 7, are all scribed to the same depth in the bottom surface 15 before the same is ground accurately to the final spherically concave form and deep enough so as not to be obliterated by this grinding. The lines are secured in the quartz by filling the scribed lines with a suitable enamel which, when subsequently baked, makes the lines bold and easily visible. The shallow spherical grinding of the bottom surface 15 is done only after the quartz disk 12 is otherwise completed, that is to say, after the graduation lines are cut in and filled. Depending upon the radius of curvature of surface 15, as well as the spacing of lines 16, each scale division of the closely spaced graduation lines 16 may be equal to from one to say five ten-thousandths of an inch of movement in one linear foot, so that errors may be read directly either in seconds of an arc or in ten thousandths of an inch to the foot in any direction. The finer level measurements mentioned are for astrophysical and geophysical applications. Such closeness of measurement, however, is usually unnecessary in machine tool work and certain other applications. With the present construction, the flat top surface 17 on disk 12 and the abutting flat bottom surface 18 on the glass cover disk 11 are ground and polished as is also the flat top surface 19 of said disk, and by virtue of the much lower temperature coefficient of expansion of the fused quartz, I am enabled to increase the radius of the spherical bottom surface 15 appreciably over that used in the glass cover disk in the level construction of my Patent No. 2,316,777, and I am therefore enabled to obtain proportionately increased sensitivity and greater accuracy with the present construction. In other words, the concavity at 15 is much shallower in the present construction than in that of Patent No. 2,316,777, despite how the concavity is shown in the present drawing for purposes of better illustration, and to avoid an observer getting the impression that the surface 15 is flat. In FIG. 2 the bubble 14 is shown in the exact center with the innermost graduation lines 16 tangent thereto, and it is obvious that any out-of-level condition can be detected at once by a shift in the position of the bubble with respect to these lines, and one may level the surface with one setting instead of having to move the level several times in positions at right angles to one another, as was necessary with tubular levels. The fact that the bubble 14 moves relative to the spherically concave surface 15 directly under the graduation lines 16 obviously makes for the best obtainable accuracy and closest reading possible. The disk 12, which in turn supports disk 11, is supported on an annular internal shoulder 20 provided therefor in the cup 10 at a certain elevation relative to the bottom wall 21 of the cup. A metal ring 22 is fused onto the top of disk 11, similarly as disclosed in my Patent No. 2,316,777, and affords a means whereby the disk 11 may be secured to the rim portion 23 of the cup 10 by soldering, as indicated at 24. The disks 11 and 12 fit fairly loosely in the rim of the cup and enough solder finds its way between the peripheries of the disks and the rim of the cup to hold the disks tightly in position while the solder also provides a hermetic seal. The solder 24 providing the hermetic seal between the rim 23 of the cup 10 and the upper disk 11 does not hermetically seal the lower disk 12 with respect to said rim portion 23 and as a result I obtain a further advantage in the use of the separate lower disk 12 in that the pressure on opposite sides of the lower disk 12 is always substantially equalized and the lower disk 12 is therefore not subject to whatever deflection the upper disk 11 may be subject to with changes in pressure in the cup 10. The thinness of the sheet metal used in the cup 10 and its resilience are advantageous for the present purposes because there is no necessity, therefore, for any extra spring diaphragm and perhaps also additional tensioning spring means therefor. Inasmuch as the bottom wall 21 of the cup is adapted to give with increase in internal pressure of the pool 13 thereon, due to changes in temperature, the bubble 14 will not vary in diameter too greatly. The elimination of extraneous tension spring means and adjustments therefor is of advantage not only because of the simplicity of construction and reduced cost, but also because it eliminates a probable source of trouble due to tampering with the instrument. At 25 is indicated a drop of solder applied to close a small filling opening in the bottom 21 after the chamber in the bottom portion of the cup 10 has been filled with the liquid ether or other fluid medium indicated at 13 employed in conjunction with the air bubble 14. In passing, I would call attention to the cast iron circular frame 26 in which the level unit 8 is mounted resting on an annular shoulder 27 therein and cemented in place by a fill of plaster of Paris 28 all around the cup 10. The ring 26 has three radial projections 29 spaced 120° apart, and a vertical bore 30 is provided in each of these projections for reception of the adjustable supports 9 for mounting the level on the base 7.

Referring now to FIGS. 3 to 5, each of the adjustable supports 9, covered in a divisional application, Serial No. 663,678, filed June 5, 1957, now Patent No. 2,940,784, is specially constructed to enable precision adjustment of the level 8 relative to the base 7 (or a fixed support on a machine or instrument) and to maintain such adjustment once made. Each support comprises a sleeve 31 that is threaded right-handed externally, as indicated at 32, and right-handed internally, as indicated at 33, and is slotted lengthwise diametrically thereof, as indicated at 34 for radial expansibility of the threaded portion, the sleeve being threaded in the reduced threaded lower end portion 35 of the bore 30 in projection 29 and having diametrically opposed holes 36 in the upper end thereof, in which a pin or the same wrench used in tightening the screw 39 may be inserted to turn the sleeve in either direction for up or down adjustment of the level with respect to the base. A hollow screw 37 has an axial bore 38 through which a clamping screw 39 can be passed and threaded in a vertical hole 40 provided in the base, the cylindrical head 41 on the screw passing freely through the bore in the sleeve 31 and having a socket 42 therein to receive an Allen wrench for tightening. The external threads 43 on the screw 37 match the threads 33 in the sleeve 31 so that the screw 37 can be threaded in the lower end portion of the sleeve, as shown in FIG. 3. The screw 37 is slotted intermediate its ends from opposite sides transversely in closely spaced relation, as shown at 44 and 45, for longitudinal compressibility, and hence, when the screw 39 is tightened enough to fasten the hollow screw 37 to the base 7 and hold it against turning, that is generally enough to take up play between the threads 43 on the hollow screw and the threads 33 in the sleeve 31 and also between the external threads 32 on the sleeve and the threads 35 in the frame 26. The bore 38 in the hollow screw 37 is large enough in diameter in relation to the screw 39, as indicated in FIG. 3, so that the screw 37 is free to take its own inclination independently of screw 39 as required for precision levelling of the level. The lower end 46 of the screw 37 is tapered for a self-centering fit in the concave top 47 of a washer 48 that is flat on the bottom and is seated on the flat bottom of a recess 49 provided therefor in the base 7. This mounting for the screw 37 also permits such small inclination of the screw 37 with respect to the base 7 as may be necessary in order to get the level properly adjusted with respect to the base. Assuming that there are say twenty threads per inch at 32 on the outside of the sleeve 31 and say eighteen threads per inch at 33 on the inside of the sleeve and at 43 on the outside of the hollow screw 37, a ten to one ratio is obtained for a very fine adjustment. In other words, ten turns of the sleeve 31 are required to raise or lower one side of the frame 26 relative to base 7 the equivalent of only one thread on screw 37. When screw 39 is loosened, sleeve 31 may be adjusted in either direction independently of screw 37, the latter then turning with the sleeve freely relative to the base. It is also clear that the screw 39, while ordinarily tightened only enough to take up play between the parts, may be tightened a little more to lock the parts in adjusted position.

It is believed the foregoing description conveys a good understanding of the objects and advantages of my invention. The appended claims have been drawn to cover all legitimate modifications and adaptations.

I claim:

1. As an article of manufacture, a circular cover glass for a spherical spirit level made of plate glass, having parallel flat top and bottom surfaces, and a plano-concave circular bottom glass of fused quartz separate from but disposed below the bottom face of said cover glass when both of said glasses are in operative position in a cup in a level with the concave face down, said concave face being spherically conformed on a radius that is large in relation to the radius of said cover glass and bottom glass, one of said glasses being marked on one face to provide graduation lines in transverse relation.

2. A levelling instrument comprising, in combination, a cup member having an annular shoulder provided therein spaced upwardly from the bottom wall thereof, a bottom glass of fused quartz resting on said shoulder and defining the top wall of a chamber receiving a pool of liquid with an air bubble floating thereon, said bottom glass having a flat top surface and a concave bottom surface spherically conformed on a radius that is large in relation to the dimensions of said bottom glass, a cover glass of glass, having properties like plate glass, separate from but disposed in superimposed relation to said bottom glass in said cup and having parallel flat top and bottom surfaces, and means fastening said cover glass in said cup in hermetically sealed relationship thereto and holding the bottom glass in contact with said shoulder in said cup, one of said bottom glass and cover glass having graduation lines marked thereon in transverse relation, the pressure on opposite sides of said bottom glass being equalized by virtue of its enclosure in said cup and its being separate from the cover glass, whereby said bottom glass is not subject to deflection with pressure changes in said cup.

3. A levelling instrument comprising, in combination, a cup member having an annular shoulder provided therein spaced upwardly from the bottom wall thereof, a bottom glass of fused quartz resting on said shoulder and defining the top wall of a chamber receiving a pool of liquid with an air bubble floating thereon, said bottom glass having a flat top surface and a concave bottom surface spherically conformed on a radius that is large in relation to the dimensions of said bottom glass, a cover glass of glass, having properties like plate glass, separate from but disposed in superimposed relation to said bottom glass in said cup and having parallel flat top and bottom surfaces, and means fastening said cover glass in said cup in hermetically sealed relationship thereto, said bottom glass having the bottom surface thereof marked to provide graduation lines in transverse relation, the pressure on opposite sides of said bottom glass being equalized by virtue of its enclosure in said cup and its being separate from the cover glass, whereby said bottom glass is not subject to deflection with pressure changes in said cup.

4. A levelling instrument comprising, in combination, a circular cup member having an annular shoulder provided therein spaced upwardly from the bottom wall thereof, a circular glass of fused quartz resting on said shoulder and having a flat top surface and a concave bottom surface, the latter being spherically conformed on a radius that is large in relation to the radius of said glass, said glass defining the top of a chamber in said cup receiving a pool of liquid with an air bubble floating thereon, the bottom surface of said glass being marked to provide graduation lines in transverse relation, and means in said cup hermetically enclosing and in close abutment with the entire flat top surface of said glass but otherwise independent thereof for securing said glass in said cup.

5. A spirit level comprising, in combination, a cup having a rim portion with an annular shoulder defined therein in elevation relation to the bottom wall of the cup, the cup containing a shallow pool of transparent liquid with a bubble floating thereon, a cover glass hermetically sealed in the rim portion of said cup, said cover glass having a flat bottom surface, and a plano-concave bottom glass retained by said cover glass in contact with said annular shoulder with the concave face down, said concave face being spherically conformed on a radius that is large in relation to the dimensions of said cover glass and bottom glass and giving circular form to the bubble, the bubble being movable radially relative to the cup in relation to transverse graduation lines that are horizontal and suitably located with respect to said cover glass and bottom glass and the bubble to indicate a level or out-of-level condition universally, the pressure on opposite sides of said bottom glass being equalized by virtue of its enclosure in said cup and its being separate from the cover glass, whereby said bottom glass is not subject to deflection with pressure changes in said cup.

6. A spirit level as set forth in claim 5 wherein the bottom glass is of fused quartz.

7. A spirit level as set forth in claim 5 wherein the bottom glass is of fused quartz and has the graduation lines marked on the concave bottom face thereof.

References Cited in the file of this patent
UNITED STATES PATENTS

| | | |
|---|---|---|
| 2,211,201 | Fell | Aug. 13, 1940 |
| 2,215,310 | Zupanec | Sept. 17, 1940 |
| 2,316,777 | Fell | Apr. 20, 1943 |
| 2,338,271 | Ulanet | Jan. 4, 1944 |
| 2,514,492 | Hayward | July 11, 1950 |
| 2,565,628 | Ravilious | Aug. 28, 1951 |
| 2,592,889 | Grimley | Apr. 15, 1952 |

OTHER REFERENCES

Judge: "Engineering precision measurements," 2nd edition, Chapman and Hall Ltd., London, 1950, pp. 255 to 258 relied on. (Copy in Div. 66.)